United States Patent [19]

Reinartz et al.

[11] Patent Number: 5,388,898
[45] Date of Patent: Feb. 14, 1995

[54] HYDRAULIC BRAKE SYSTEM INCLUDING AN ANTI-LOCKING CONTROL

[76] Inventors: Hans-Dieter Reinartz, In der Roemerstadt 169, 6000 Frankfurt/Main 50; Helmut Steffes, Am See 22, 6234 Hattersheim 3, both of Germany

[21] Appl. No.: 50,458
[22] PCT Filed: Oct. 26, 1991
[86] PCT No.: PCT/EP91/02030
  § 371 Date: Sep. 30, 1993
  § 102(e) Date: Sep. 30, 1993

[30] Foreign Application Priority Data

Nov. 22, 1990 [DE] Germany .............................. 4037168

[51] Int. Cl.⁶ ............................................ B60T 13/14
[52] U.S. Cl. .................... 303/116.2; 303/11; 303/DIG. 2
[58] Field of Search ............. 303/10, 11, 116.1, 116.2, 303/115.5, DIG. 1, DIG. 2, 113.1, 113.2; 180/197

[56] References Cited

U.S. PATENT DOCUMENTS

| | | | |
|---|---|---|---|
| 4,618,189 | 10/1986 | Nakanishi et al. | 303/116.1 |
| 4,703,979 | 11/1987 | Nakanishi et al. | 303/116.1 |
| 4,750,788 | 6/1988 | Seibert et al. | 303/116.2 X |
| 5,152,589 | 10/1992 | Ocvirk | 303/116.2 |
| 5,209,552 | 5/1993 | Reinartz et al. | 303/116.2 |
| 5,213,399 | 5/1993 | Burgdorf et al. | 303/116.2 X |

FOREIGN PATENT DOCUMENTS

| | | |
|---|---|---|
| 3505410 | 8/1986 | Germany . |
| 3831426 | 4/1989 | Germany . |
| 3813145 | 11/1989 | Germany . |
| 1182153 | 7/1989 | Japan . |
| 2214250 | 8/1989 | United Kingdom ............. 303/116.2 |

*Primary Examiner*—Robert J. Oberleitner
*Assistant Examiner*—Alfred Muratori
*Attorney, Agent, or Firm*—Robert P. Seitter; J. Gordon Lewis

[57] ABSTRACT

A hydraulic antilock brake system is described, with a multi-way valve hydraulically switched to connect the brake pressure generator (1) to the wheel brake (2), controlling, in response to the pump pressure prevailing in the auxiliary pressure conduit (4), the pressure fluid connection between the brake pressure generator (1) and the wheel brake (2). The valve (3) is switched by pump pressure in the absence of pressure from the brake pressure generator, but held or switched open if the brake pressure generator is operated. This allows a low-cost adaption to traction slip control with no need for additional electronic controls while substantially preserving the basic circuit configuration, especially the electronic control system.

10 Claims, 5 Drawing Sheets

HYDRAULIC BRAKE SYSTEM INCLUDING AN ANTI-LOCKING CONTROL

BACKGROUND OF THE INVENTION

The present invention is concerned with a hydraulic brake system including an anti-locking control, in particular for use with automotive vehicles,.

A brake system of the afore-mentioned type is disclosed in German Patent Application No. P 40 15 882 which is concerned with a so-called closed anti-locking control system (ASS) which, as opposed to the state-of-the-art open anti-locking control systems, does not have a direct connection of the auxiliary pressure and return-flow system to the non-pressurized supply tank provided on the master cylinder side. The auxiliary pressure system, during the brake slip control, withdraws from the low-pressure accumulator disposed on the return-flow conduit to the pump the required pressure fluid volume, conveying the same to the master cylinder pressure conduit. At the same time, excess pressure fluid is supplied to a high-pressure accumulator provided in the branch conduit leading to the auxiliary pressure conduit, with the pressure level of the high pressure accumulator being adjusted through a pressure relief valve coupled thereto. In response to the electromagnetic actuation of the inlet and outlet valves disposed in the master pressure conduit and the return conduit, the anti-locking control is then effected in the associated wheel brakes.

The circuit configuration involved does not enable the afore-described brake system to control the start-up and traction slip, respectively. Actuation of the pump in response to traction slip, inevitably, would result, as a consequence of the pedal being in the release position, in a return flow of pressure fluid to the supply tank rather than to the wheel brake.

It is, therefore, the object of the present invention to improve a brake system having the afore-described features so as to enable, by substantially preserving the basic circuit configuration, in particular, the control system, a low-cost improvement of the traction slip control with no need for enhancing the electronic controls of the brake system.

SUMMARY OF THE INVENTION

This problem is solved through the provision of a multi-way valve substantially controlled by the auxiliary pressure, the brake pressure generator isolated from the controlled wheel brake by the multiway valve. The hydraulic actuation involves a switching pattern which may be carried out with minimal electronic controls.

One embodiment of the invention provides, in a first switching condition, a pressure fluid connection between the multi-way valve, configured as a 2-way/2-position valve, and the auxiliary pressure conduit, through a 3-way/2-position valve to which the pressure of the brake pressure generator can be applied. In a second switching condition, the 3-way/2-position valve enables a hydraulic connection between the multi-way valve and a pressure fluid supply line connecting the pump intake conduit to the main pressure conduit. The 3-way/2-position valve insures the proper application of auxiliary pressure to the system coupled to the pump, with the multi-way valve, initially, being held, by a compression spring, in the basic condition.

Alternatively, the multiway-valve may be configured as a 4-way/2-position valve which, in a first switching condition, opens the main pressure conduit and closes a by-pass line connecting the auxiliary pressure conduit to the intake conduit. The by-pass line has in series, a throttle element and a switched-open blocking element to apply hydraulic pressure of a defined volume to a first control conduit coupled upstream of the throttle element and actuating the multi-way valve.

To preclude, on the one hand, an in-flow of pressure fluid from the intake conduit and, hence, an inadvertent switch-over of the 4-way/2-position valve, and to insure, on the other hand, the switch-over pressure required for the switch-over of the 4-way/2-position valve, a throttle and locking element is series connected to the by-pass line.

A second control conduit may be connected influencing the basic position of the multi-way valve to the brake pressure generator. A third control conduit may also be connected in communication with the auxiliary pressure conduit.

The multi-way valve, when configured as a 2-way/2-position valve, may alternatively be actuated by an arrangement in which the by-pass conduit provided with the throttle element and the check valve is connected to a control conduit connecting the multi-way valve to another 2-way/2-position valve, with the auxiliary pressure supply of the multi-way valve, through the switchover of the other 2-way/2-position valve controlled by the brake pressure generator, being capable of being discontinued.

A modular construction of the brake system has proved to be particularly advantageous, wherein the hydraulically controlled multi-way valve, with the functional components thereof forming a so-called ASR-block which, in addition to the actual anti-locking system and pump pressure control block forms an independent module.

DETAILED DESCRIPTION

Figure 1:
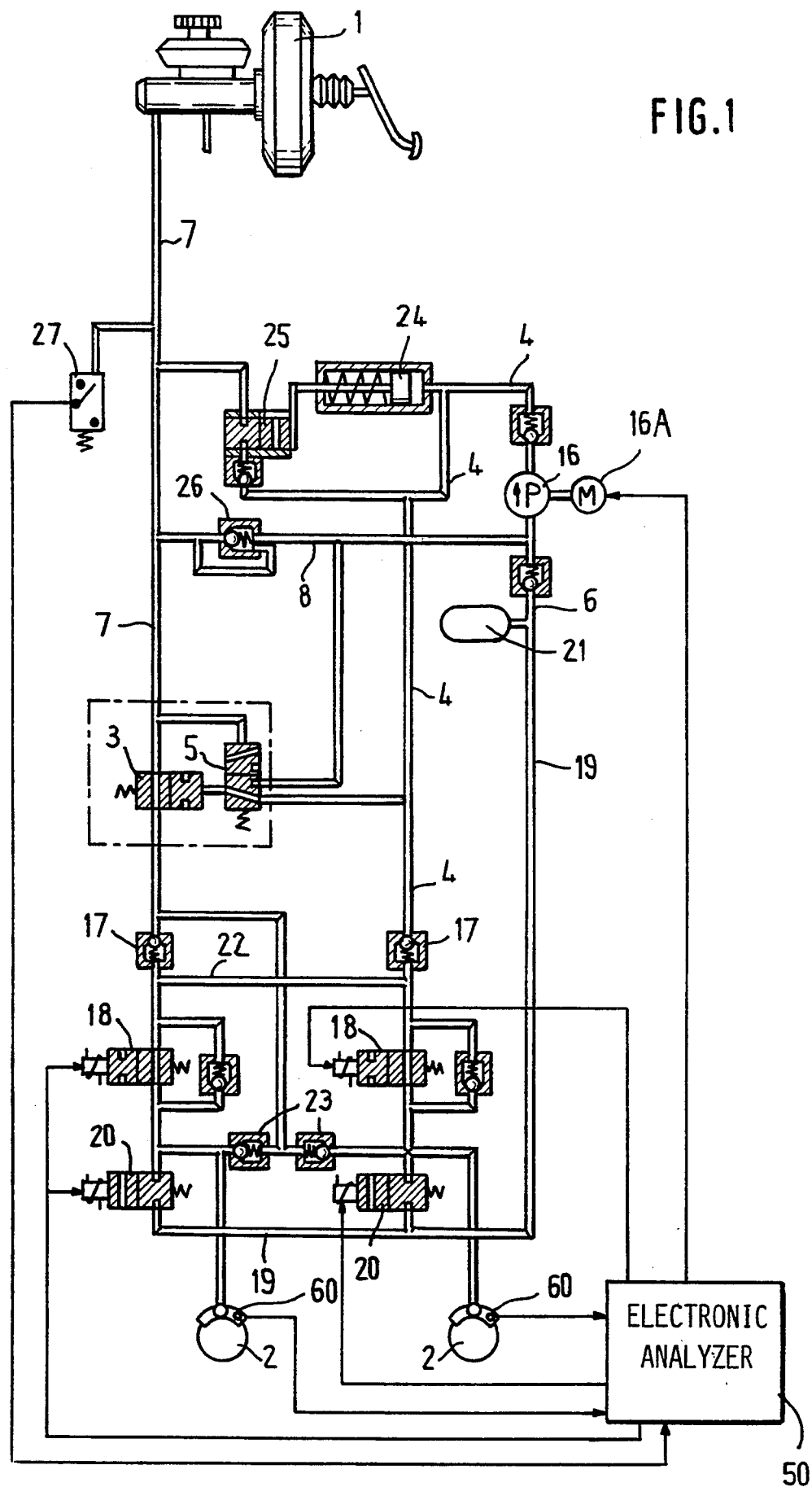
FIG. 1 is a diagram of the brake system according to the invention comprising an ASR-block composed of 2-way/2-position and 3-way/2-position valves.
Figure 2:
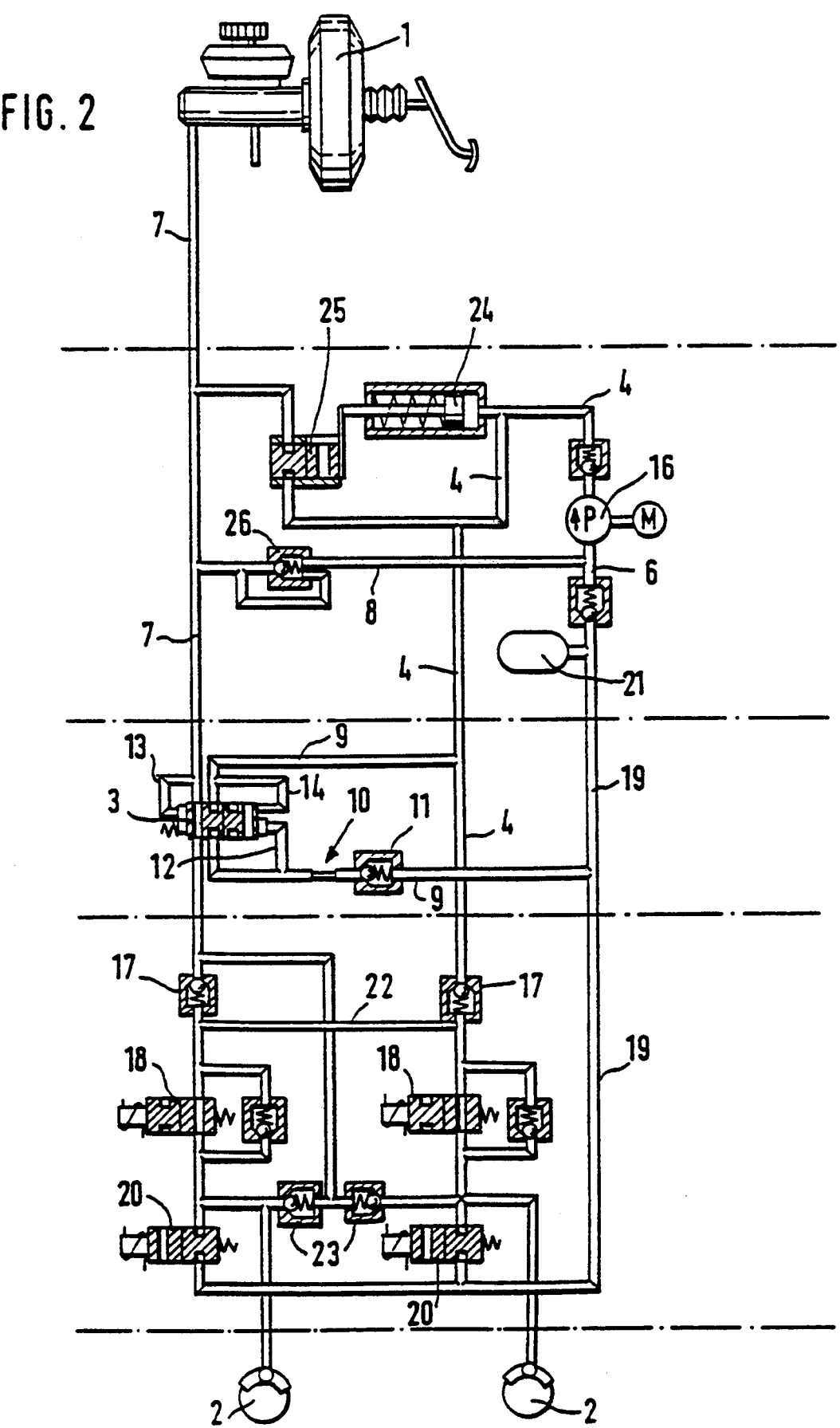
FIG. 2 is a diagram of an alternative switching brake system comprising an ASR-block composed of a 4-way/4-position valve.
Figure 3:
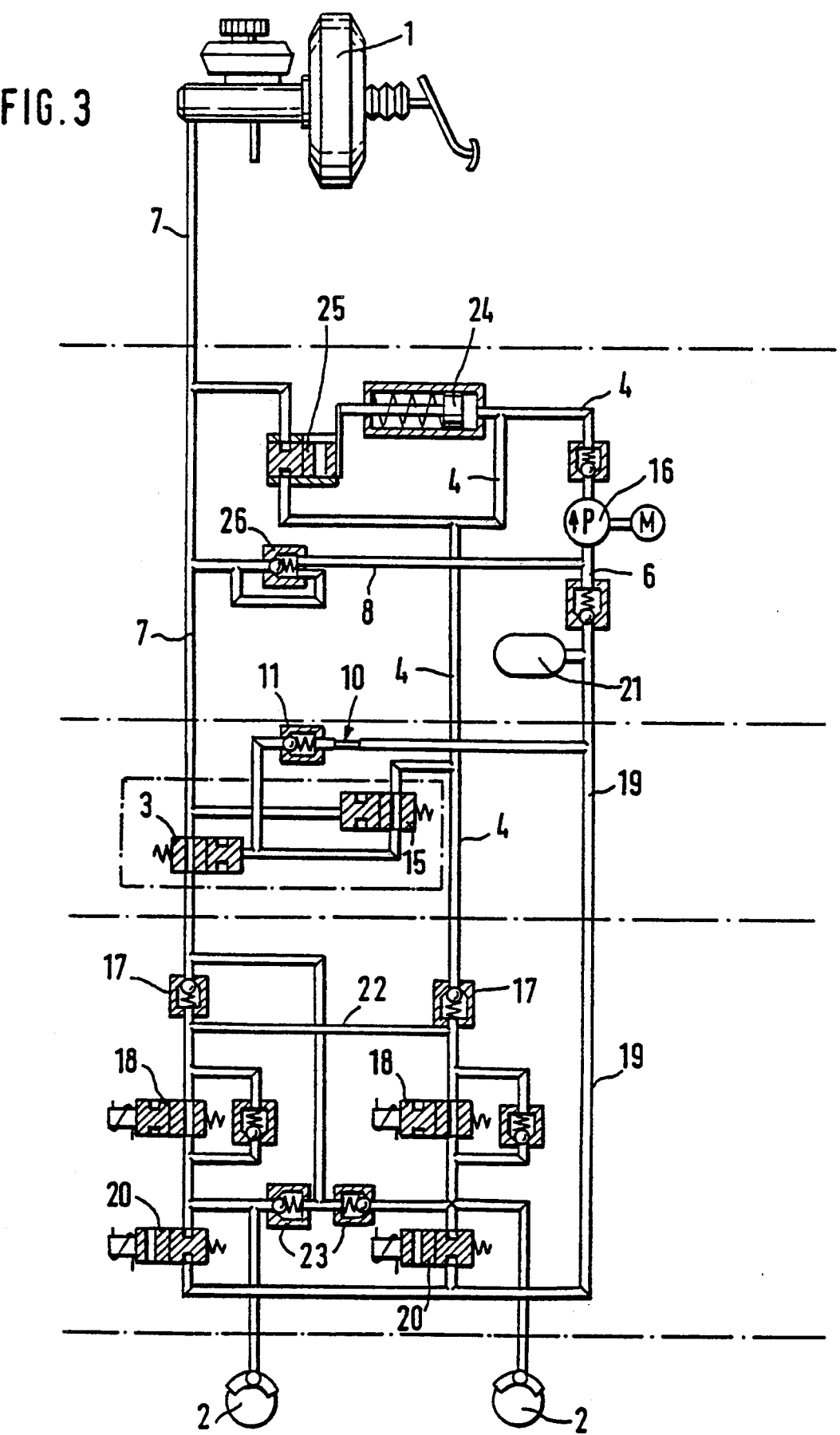
FIG. 3 is a diagram of another brake system comprising an ASR-block composed of 2-way/2-position valves.

The basic configuration of a brake system in which a brake control circuit according to the invention is incorporated is identical for FIGS. 1 to 3.

Firstly, the brake system has a master pressure conduit 7 connected to a brake pressure generator 1 (i.e., a master cylinder) with a multi-way valve 3 according to the invention connected in series controlled by the pressure developed by a motor driven pump 16. A check valve 17 blocking in the direction of the brake pressure generator 1, and an electromagnetic inlet valve 18 are associated with the wheel brake 2. Provided in a return conduit 19 in communication with the wheel brakes 2 are electromagnetic outlet valves 20 and a low-pressure accumulator 21 coupled thereto and supplying pressure fluid to the inlet of the pump 16. Wheel angular velocity is detected by sensors 60 which generate signals transmitted to electronic analyzer 50, which upon detection of incipient wheel slip condition will in turn send control signals to inlet valves 18, outlet valves 20, and motor 16A of the pump 16.

Connected to the pump 16 is the auxiliary pressure conduit 4 accommodating a check valve 17 blocking in the direction of the pump 16, check valve 17, in turn supplying pressure fluid to the inlet valves 18 associated with the two wheel brakes.

A connecting passageway 22 provided on the auxiliary pressure conduit 4 between the check valve 17 and the inlet valve 18 insures the pressure supply to the second inlet valve 18. Moreover, a hydraulic connection provided with check valves opening in the direction of the brake pressure generator 1 branches from the wheel brakes 2, which hydraulic connection terminates in the vicinity of the multi-way valve 3 on the master pressure conduit 7. In addition, a first branch provided on the auxiliary pressure conduit 4 in the vicinity of the pump 16 establishes a connection to the high pressure accumulator 24. A second branch provided on the auxiliary pressure conduit 4, through a pressure relief valve 25 controlled by the travel of a piston of the high pressure accumulator 24 is in communication with the master pressure conduit 7. Moreover, a check valve 26 controlled by the brake pressure generator 1 and opening in the direction of the pump intake side interconnects the master pressure conduit 7 and the pump 16.

The form of the embodiment according to FIG. 1 insures, on the intake side of the pump and on the auxiliary pressure conduit 4, a hydraulic actuation of the multi-way valve 3 configured as a 2-way/2-position valve, in response to the switching position of a 3-way/2-position valve 5. FIG. 1 shows the brake releasing position in which both way-valves remain in their basic position.

Operation

Once the brakes are applied in slip-free manner, the 3-way/2-position valve 5 is hydraulically switched over by the brake pressure generator 1 so that the 3-way/2-position valve 5 discontinues the connection between the auxiliary pressure and the multi-way valve 3, thereby causing the multi-way valve 3 to be connected to the intake side of the pump. Consequently, the multi-way valve 3 acting as an ASR-separating valve, for lack of a hydraulic switch-over pressure, remains in the open position.

Pump 16 during brake slip control is operative, however, the pressure prevailing through the auxiliary pressure conduit 4 on the 3-way/2-position valve 5 is unable to reach the multi-way valve 3 because the 3-way/2-position valve 5, to which the pressure of the pressure generator 1 is applied. The multiway valve thus remains in the blocking position.

For slip control during start-up, the auxiliary pressure of the pump 16 unimpededly actuates the multi-way valve 3 since, as a result of the inactive brake pressure generator 1, the 3-way-/2-position valve 5 remains in its basic position establishing communication between the auxiliary pressure conduit 4 and the ASR-separating valve. Consequently, the pump-sided volume is delivered to the respective traction-slip controlled wheel brakes 2 while the brake pressure generator 1 is decoupled from the control circuit.

Moreover, the wheel brakes of the non-actuated wheels of the vehicle are electromagnetically blocked through the associated inlet valves.

Through actuation of the brake pressure generator 1, the traction slip control and, hence, the blocking position of the multi-way valve 3, the delivery of the pump and the traction slip control position of the inlet and outlet valves 18,20 are rendered inoperative. In addition, the pressure switch 27 provided on the main pressure conduit 7 first senses the normal-brake mode to render inoperative, through electrical signal processing in electronic analyzer 50, the pump 16 and the inlet and outlet valves 18,20.

FIG. 2 shows another circuit alternative for controlling the pressure fluid pattern.

In the normal brake mode, the multi-way valve 3, configured as a 4-way/2-position valve, is in the switching position as shown in the drawing, according to which, on the one hand, the connection between the brake pressure generator 1 and the wheel brake 2 is opened and, on the other hand, the by-pass line 9 connecting the pressure side to the intake side of the pump 16 is blocked.

Upon commencement of the brake slip control, the auxiliary pressure of the pump 16 prevails in the by-pass line 9 down to the multi-way valve 3, remaining, under the action of the hydraulic and mechanical pressure forces exerted on the 4-way/2-position valve, in the basic position opening the main pressure conduit 7. The brake slip control then follows, in known manner, by electromagnetically actuating the inlet and outlet valves 18,20 to realize the pressure build-up, pressure holding and pressure decrease phases in the wheel brakes 2.

Check valves 17 having a blocking effect toward the brake pressure generator 1 can be bypassed through the check valves 23 disposed in parallel to the main pressure conduit 7, to enable a manual decrease in the brake pressure. The check valves 17, on the one hand, prevent an inadvertent back flow of the pressure fluid delivered by the pump to the wheel brakes 2 and, on the other hand, the two check valves 17 coupled upstream of the inlet valve 18 permit an unimpeded manual resupply of pressure fluid from the brake pressure generator 1.

For start-up control purposes, the pressure output from pump 16 and prevailing in the by-pass conduit 9 and applied through control conduit 14 will be adequate to move the multi-way valve 3 to the position thereof blocking the main pressure conduit. Hence, pressure is applied to the start-up slip-controlled wheel brakes 2 respectively coupled to the pump 16 in response to the switching position of the associated inlet and outlet valves 18,20. Once the traction slip control is interrupted by the actuation of the brake pressure generator 1, the pressure of the brake pressure generator 1 applied through control conduit 13 restores the multi-way valve 3 to a stable open basic position, with the change-over pressure in the by-pass conduit 9 valve-sidedly counteracting the pressure of the brake pressure generator being decreased through the control conduit 12 and throttle and blocking element 10, 11.

This embodiment of the multi-way valve 3 involves the advantage of a fully hydraulic control of the ASR-separating valve, thereby foregoing the provision of a special pressure switch for sensing the normal brake mode. Moreover, it is feasible to modularly integrate the ASR-parts between the pump and ABS-block to thereby cause, in a preferred embodiment, an ASR-intermediate plate to connect the pump portion to the ABS- valve block. Hence, the same valve block housing can be used both for ABS- and for ABS-/ASR-brake systems with no need for any special structural adjustment for functional extension purposes.

FIG. 3 shows another basic ASR-valve switching arrangement in the form of two 2-way/2-position valves 3,15 disposed separately with respect to one another and being switchable independently of one another yet hydraulically interconnected to one another. The multi-way valve 3 configured as a 2-way/2-position valve, in spring-force supported manner, takes the basic position opening the connection between the brake pressure generator 1 and the wheel brakes 2. It is only by the application of pressure to the second 2-way/2-position valve 15 connecting, in the basic position, the pump 16 to the multi-way valve 3 that the multi-way valve 3 switches to the switching position blocking the main pressure conduit 7 so that the brake pressure generator 1 is not in communication with the wheel brake 2 and, hence, from the ARS-control.

Once a pressure in proportion to the pedal force has been built up in the main pressure conduit by the manual actuation of the brake pressure generator 1, the second 2-way/2-position valve 15 is hydraulically shifted to the switching position blocking the pump pressure by the multi-way valve 3. Any excessive control pressure volume trapped between the two 2-way/2-position valves 3, 15, is vented through a line branch having blocking element 11 and a throttle element 10, to the intake side of the pump 16. The blocking element 11 is configured as a check valve closing toward the multi-way valve 3 to prevent inadvertent closure of the multi-way valve 3 due to an intake-sided discharge of the wheel brake volume.

FIG. 3 is an alternative to the valve control according to FIG. 2, having the advantage that there is no direct interdependence between the individual switching functions of the valve.

Figure 4:
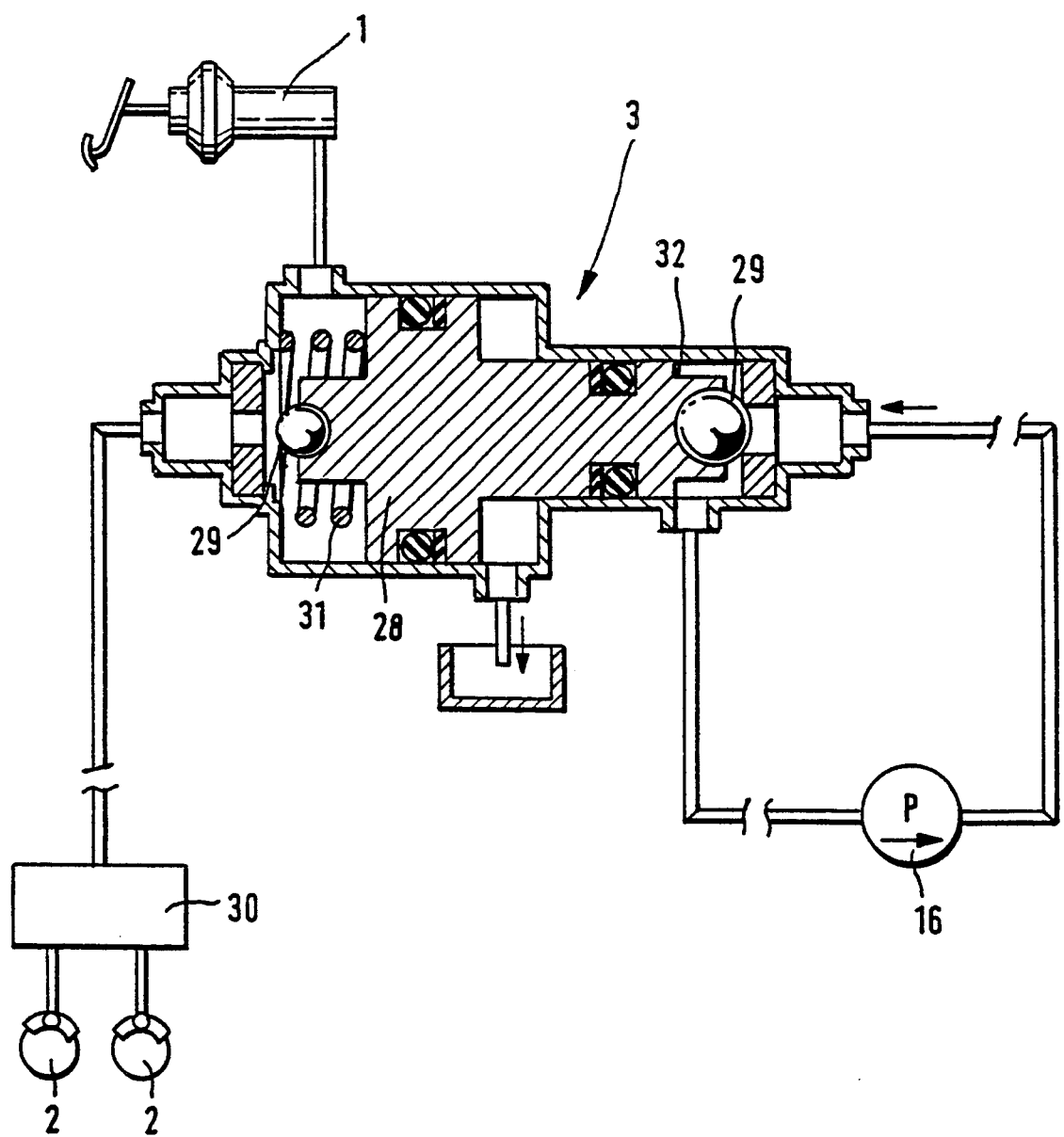
FIG. 4 is a sectional view of the 4-way/4-position valve used in the system of FIG. 2.

FIG. 4 shows an advantageous structural embodiment of the multi-way valve 3 illustrated in FIG. 2. The multi-way valve 3 is comprised of a 4-way/2-position valve having a stepped diameter piston 28 having fixed on each side, a ball valve 29 controlling either the pressure fluid connection between the brake pressure generator 1 and the wheel brake-sided ABS-valve block 3 or the pressure fluid communication between the pump 16 and the pump intake side. A compression spring 31 interposed between the housing wall and the front side of the step-type piston 28 establishes the open, basic position of the ASR-separating valve.

In a slip-free normal deceleration, the pressure of the brake pressure generator 1 prevails at the large front face of the stepped diameter piston 28 to which spring force is applied. Due to the compression spring 31, the valve is initially open. In that basic position, there is no intake of additional pressure fluid volume. Once pump 16 is actuated for the purposes of the ABS-control, the stepped diameter piston 28 remains in the open basic position as shown. The selected relationship of the large front face to which spring force and, in addition, pedal force, is proportionally applied, to the smaller front face of the valve seat on the stepped diameter piston 28 to which pressure is applied from the pump side, stabilizes the basic position of the stepped diameter piston 28.

Compared thereto, the relatively high pump pressure, in the ASR-mode, acts on the smaller area of the seated ball valve 29. Once the area ball valve 29 opens slightly in the absence of pressure from the brake pressure generator the annular face of a smaller diameter of the piston step 32 will be subject to pump pressure, thereby producing a rapid switching of the valve.

The stepped diameter piston 28 is, therefore, able to maintain, at a relatively low pressure, the opened position toward the intake side of the pump 16, while the ball valve 29 on the larger diameter piston step closes the connection of the brake pressure generator 1 to the ABS-valve block in communication with the wheel brake 2. The pressure for the traction slip control is freely built up.

If the pressure from the brake pressure generator 1 is applied to the front face of the large piston step 31, the ball valve 29 facing the pump connection closes while the ball valve 29 facing the compression spring 31 opens the passage toward the wheel brakes. Once the ball valve 29 controlling the by-pass conduit between the pump pressure and the pump intake side closes, the throttle and blocking element shown in FIG. 2 causes the release of the pressure exerted against the smaller diameter piston step.

Hence, as a result of the smaller diameter piston step 32 being now ineffective, the switching position of the step-piston 28 is stabilized. It is achieved thereby that, even with pump pressure still effective, the pressure fluid connection also remains open toward the wheel brakes at a relatively low pressure provided by the brake pressure generator 1.

Figure 5:
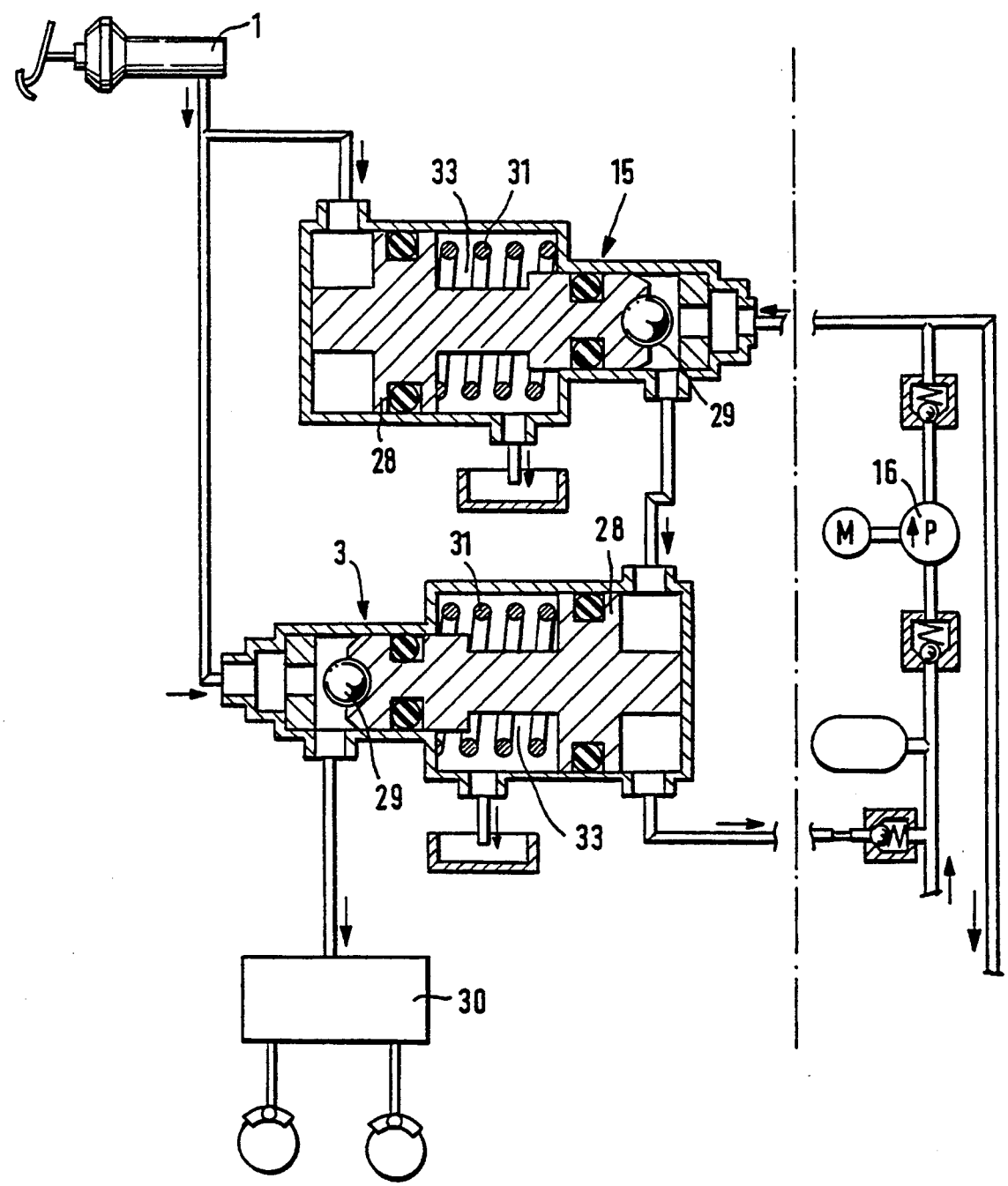
FIG. 5 is a sectional view of another valve construction for the 2-way/2-position valves used in the system of FIG. 3.

FIG. 5 describes the structural details of the valves used in the hydraulic circuit of FIG. 3.

Both 2-way/2-position valves 3,15 are provided with stepped diameter pistons 28 which each have a ball valve 29 disposed on an extension thereof, thereby establishing, in the first valve 15, pressure fluid communication between the pressure side and the intake side of the pump 16.

The ball valve 29 of the second 2-way/2-position valve 3 establishes the pressure fluid communication between the brake pressure generator 1 and the wheel brakes coupled to the valve block 30. The compression springs 31, as opposed to the illustration according to FIG. 4, are clamped within the non-pressurized annular leakage chamber 33 of each way-valve 3,15 and initially hold both valves in their opened basic position.

Concerning the way of operation thereof, reference is made to the part of the description relating to FIG. 3.

We claim:

1. A hydraulic wheel brake system having an anti-locking control for braking wheels of an automotive vehicle, comprising a brake pressure generator for generating pressurized hydraulic fluid, a low-pressure accumulator, at least one wheel brake, a main pressure conduit connecting said wheel brake with said brake pressure generator, a return conduit connecting said wheel brake with said low pressure accumulator, an electromagnetically actuated outlet valve closing said return conduit in an inactive condition thereof and opening said return conduit in a switching condition, an electromagnetically controlled inlet valve in said main pressure conduit, a motor driven pump having an inlet, a fluid supply conduit connecting said pump inlet to said pressure generator through said main pressure conduit so as to draw hydraulic fluid from said low pressure accumulator, an auxiliary pressure conduit connected to said at least one wheel brake, said pump having an outlet delivering a flow of pressurized hydraulic fluid to said auxiliary pressure conduit, a sensor for detecting the angular velocity of a wheel to be braked and generating a corresponding signal, an electronic analyzer analyzing said sensor signal and generating switch signals for said pump motor and said inlet and outlet valves, a high pressure accumulator connected to said pump outlet to receive said flow of pressurized hydraulic fluid, a pressure relief valve in communication with said auxiliary pressure conduit and responsive to a defined pressure within said high-pressure accumulator to switch from a blocking condition to an open condition, thereby enabling hydraulic fluid to be conveyed to said brake pressure generator, a multi-way valve having an open initial condition responsive to a pressurized state in said main pressure conduit to establish a pressure fluid connection between said brake pressure generator and said wheel brake coupled thereto, said multi-way valve also having a switched blocking condition, assumed in response to said pump pressure prevailing in said auxiliary pressure conduit, in which blocking condition said pressure fluid connection between said brake pressure generator and said wheel brake coupled thereto is closed, and, a three-way/two-position valve having the pressure of said brake pressure generator applied thereto, said three-way/two-position valve having an initial first condition establishing a hydraulic connection between said multi-way valve and said auxiliary pressure conduit, said three-way/two-position valve having a second switching condition which establishes a hydraulic connection between said multi-way valve and said pressure fluid supply conduit.

2. A hydraulic brake system having an anti-locking control as claimed in claim 1, wherein said multi-way valve and said three-way/two-position valve are each biased to said initial condition by a compression spring.

3. A hydraulic brake system having an anti-locking control as claimed in claim 1 further including traction slip control components, and wherein said multi-way valve and said traction slip control components form a modular function block.

4. A hydraulic wheel brake system having an anti-locking control for braking wheels of an automotive vehicle, comprising a brake pressure generator for generating pressurized hydraulic fluid, a low-pressure accumulator, at least one wheel brake, a main pressure conduit connecting said wheel brake with said brake pressure generator, a return conduit connecting said wheel brake with said low pressure accumulator, an electromagnetically actuated outlet valve closing said return conduit in an inactive condition thereof and opening said return conduit in a switching condition, an electromagnetically controlled inlet valve in said main pressure conduit, a motor driven pump having an inlet, a fluid supply conduit connecting said pump inlet to said pressure generator through said main pressure conduit so as to draw hydraulic fluid from said low pressure accumulator, an auxiliary pressure conduit connected to said at least one wheel brake, said pump having an outlet delivering a flow of pressurized hydraulic fluid to said auxiliary pressure conduit, a sensor for detecting the angular velocity of a wheel to be braked and generating a corresponding signal, an electronic analyzer analyzing said sensor signal and generating switch signals for said pump motor and said inlet and outlet valves, a high pressure accumulator connected to said pump outlet to receive said flow of pressurized hydraulic fluid, a pressure relief valve in communication with said auxiliary pressure conduit and responsive to a defined pressure within said high-pressure accumulator to switch from a blocking condition to an open condition, thereby enabling hydraulic fluid to be conveyed to said brake pressure generator, a multi-way valve having an open initial condition responsive to a pressurized state in said main pressure conduit to establish a pressure fluid connection between said brake pressure generator and said wheel brake coupled thereto, said multi-way valve also having a switched blocking condition, assumed in response to said pump pressure prevailing in said auxiliary pressure conduit, in which blocking condition said pressure fluid connection between said brake pressure generator and said wheel brake coupled thereto is closed, and, a bypass conduit connecting said auxiliary pressure conduit to said return conduit said multi-way valve comprising a four-way/two-position valve which, in said open initial condition, keeps said main pressure conduit opened and said by-pass conduit closed.

5. A hydraulic brake system having an anti-locking control as claimed in claim 4, wherein said multi-way valve keeps said main pressure conduit closed and said by-pass conduit opened in said switching condition.

6. A hydraulic brake system having an anti-locking control as claimed in claim 4, further including a first control conduit connected to said multi valve, and wherein said by-pass conduit comprises in series connection a throttle element and a blocking element switchable to an open condition, said blocking element when open causing a hydraulic pressure of a defined amount to be applied to said first control conduit to actuate said multi-way valve, said blocking element connected upstream of said throttle element.

7. A hydraulic brake system having an anti-locking control as claimed in claim 6, further including a second control conduit controlling said initial condition of said multi-way valve which establishes a hydraulic connection to said brake pressure generator, and also including a third control conduit connected to said auxiliary pressure conduit and to said multi-way valve.

8. A hydraulic wheel brake system having an anti-locking control for braking wheels of an automotive vehicle, comprising a brake pressure generator for generating pressurized hydraulic fluid, a low-pressure accumulator, at least one wheel brake, a main pressure conduit connecting said wheel brake with said brake pressure generator, a return conduit connecting said wheel brake with said low pressure accumulator, an electromagnetically actuated outlet valve closing said return conduit in an inactive condition thereof and opening said return conduit in a switching condition, an electromagnetically controlled inlet valve in said main pressure conduit, a motor driven pump having an inlet, a fluid supply conduit connecting said pump inlet to said pressure generator through said main pressure conduit so as to draw hydraulic fluid from said low pressure accumulator, an auxiliary pressure conduit connected to said at least one wheel brake, said pump having an outlet delivering a flow of pressurized hydraulic fluid to said auxiliary pressure conduit, a sensor for detecting the angular velocity of a wheel to be braked and generating a corresponding signal, an electronic analyzer analyzing said sensor signal and generating switch signals for said pump motor and said inlet and outlet valves, a high pressure accumulator connected to said pump outlet to receive said flow of pressurized hydraulic fluid, a pressure relief valve in communication with said auxiliary pressure conduit and responsive to a defined pressure within said high-pressure accumulator to switch from a blocking condition to an open condition, thereby enabling hydraulic fluid to be conveyed to said brake pressure generator, a multi-way valve having an open initial condition responsive to a pressurized state in said main pressure conduit to establish a pressure fluid connection between said brake pressure generator and said wheel brake coupled thereto, said multi-way valve also having a switched blocking condition, assumed in response to said pump pressure prevailing in said auxiliary pressure conduit, in which blocking condition said pressure fluid connection between said brake pressure generator and said wheel brake coupled thereto is closed, and, said multi-way valve configured as a two-way/two-position valve, another two-way/two-position valve hydraulically reswitchable by said brake pressure generator to be open in an initial condition to establish a pressure fluid connection to said pump, a throttle element and a blocking element opening in the direction of said pump connected to switch said multi-way valve.

9. An automotive vehicle brake system comprising:
   at least one wheel brake;
   a brake pedal operated master cylinder;
   a master pressure conduit connecting said master cylinder and said wheel brake;
   a motor driven pump having an inlet and an outlet connected to said master pressure conduit;
   a normally open inlet valve in said master pressure conduit controlling communication of said master cylinder and said pump outlet with said wheel brake;
   a return conduit connected to said wheel brake and said inlet of said pump;
   a normally closed outlet valve in said return conduit controlling communication of said wheel brake with said inlet of said pump;
   an antilock control including means for activating said pump motor and operating said inlet and outlet valves upon detection of an incipient wheel lock condition;
   a multi-valve including first means causing pressure developed by said pump means to block communication of said master cylinder with said wheel brake, and also including second means preventing operation of said first means if said master cylinder is in a pressurized state;
   said first means including first valve means normally in an open condition allowing communication of said master cylinder with said wheel brake, and switchable by pressure developed by said pump to block communication of said master cylinder with said wheel brake, said second means including a second valve means controlling communication of said pump pressure to said first valve and responsive to pressure developed by said master cylinder to block said communication of said pump pressure with said first valve.

10. An automotive vehicle brake system according to claim 9 wherein said multi-valve means comprises a shiftable valve element acted on by both said master cylinder and said pump pressure.

* * * * *